United States Patent [19]

Ledvina et al.

[11] Patent Number: 4,509,323
[45] Date of Patent: Apr. 9, 1985

[54] POWER TRANSMISSION CHAIN

[75] Inventors: Timothy J. Ledvina; Robert H. Mead, both of Ithaca, N.Y.

[73] Assignee: Borg-Warner Corporation, Chicago, Ill.

[21] Appl. No.: 546,669

[22] Filed: Oct. 28, 1983

Related U.S. Application Data

[62] Division of Ser. No. 332,032, Dec. 18, 1981, abandoned.

[51] Int. Cl.³ .............................................. B21L 3/00
[52] U.S. Cl. ...................................... 59/8; 73/432 R; 29/407
[58] Field of Search ...................... 59/35.1, 901, 6, 8, 59/11, 84; 73/432 V, 432 G; 474/213; 29/407

[56] References Cited

U.S. PATENT DOCUMENTS

| 713,102 | 11/1902 | Hunt | 474/213 |
| 1,924,161 | 8/1933 | Knox | 59/35.1 |
| 2,104,946 | 1/1938 | Hinson et al. | 73/432 V |
| 3,340,745 | 9/1967 | McCann | 474/213 |
| 3,943,702 | 3/1976 | Lacombe-Allard | 59/8 |
| 4,306,455 | 12/1981 | Selleri | 73/432 G |

FOREIGN PATENT DOCUMENTS

| 363680 | 6/1930 | United Kingdom | 474/213 |
| 2076500 | 12/1981 | United Kingdom | 59/84 |

Primary Examiner—Francis S. Husar
Assistant Examiner—Linda McLaughlin
Attorney, Agent, or Firm—Aubrey L. Burgess

[57] ABSTRACT

A power transmission chain for a sprocket drive is constructed of at least two types of toed links, one engaging sprocket teeth with their outside flanks and the other engaging sprocket teeth with their inside flanks. The links are assembled as uniform sets of links of the same type, in a regular or random mixture of sets. To distinguish the types of links, one type has a curved or arcuate back and the other a flat, generally planar back. An improperly located link can be easily detected in the assembly of links.

6 Claims, 8 Drawing Figures

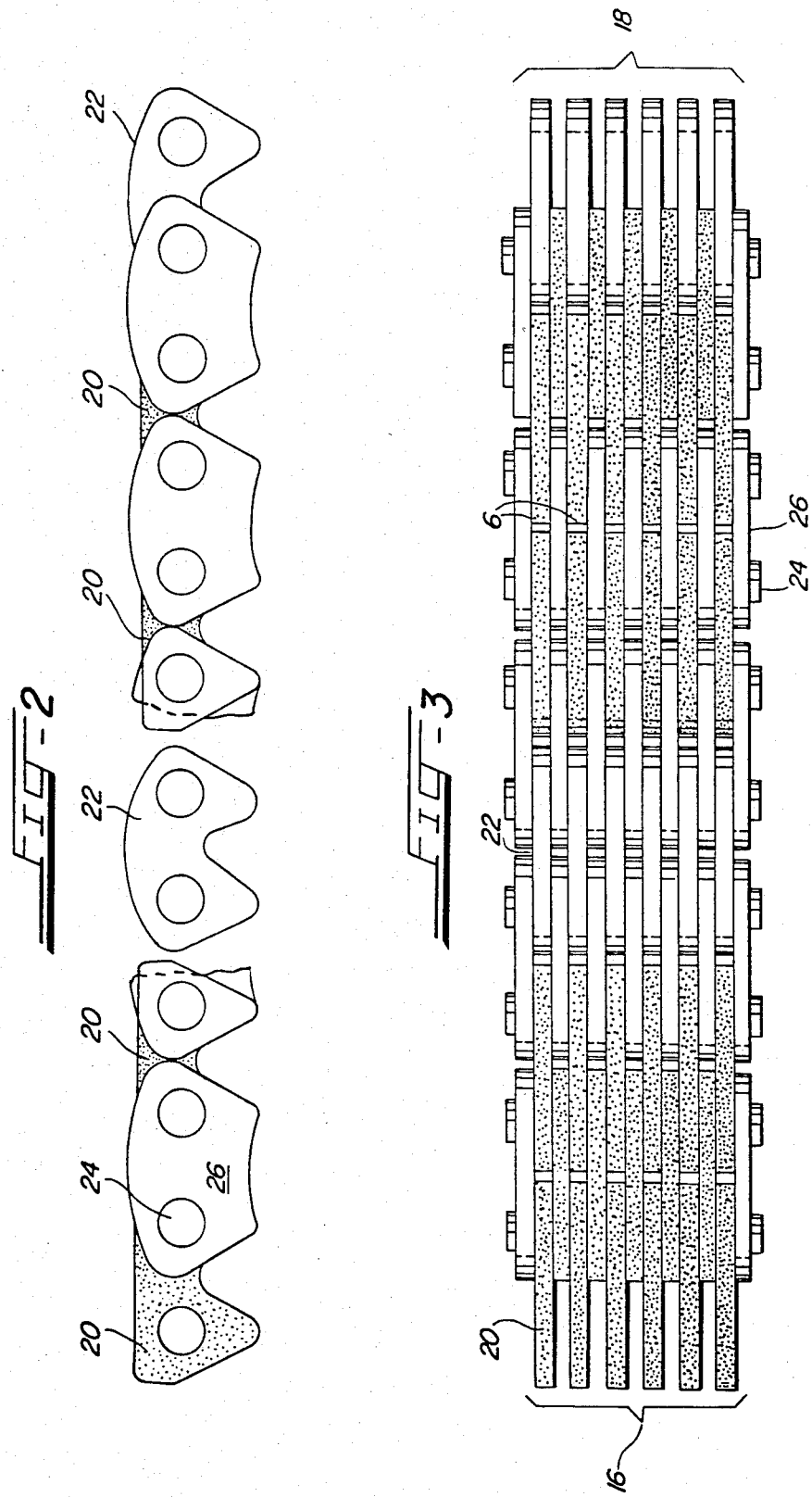

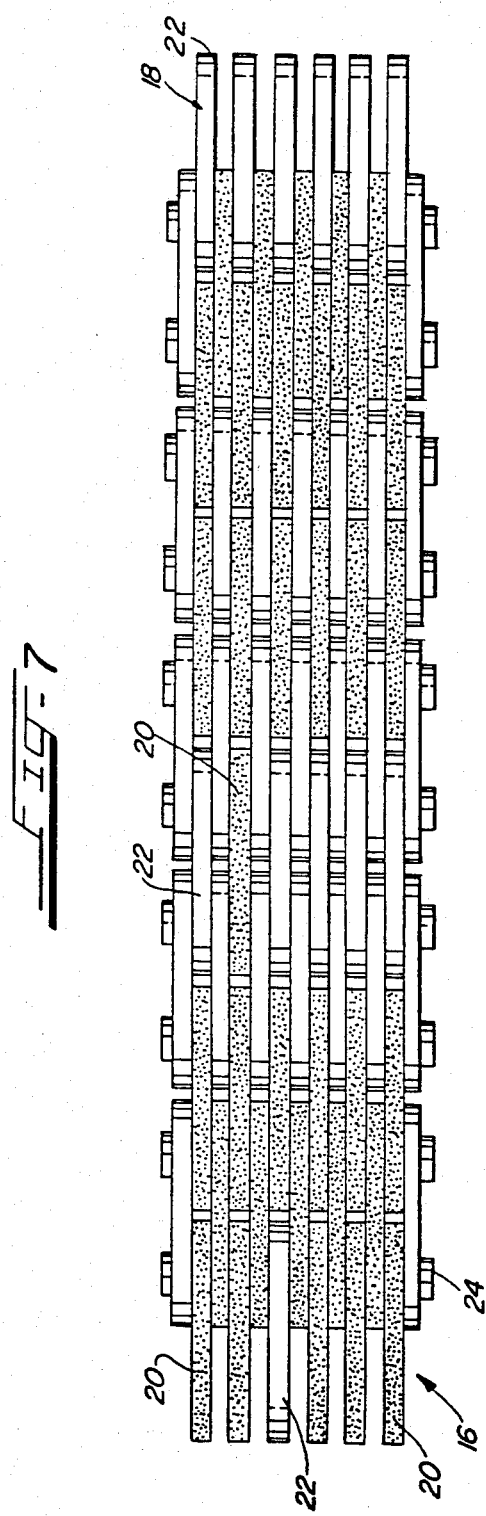

POWER TRANSMISSION CHAIN

This is a division of application Ser. No. 332,032 filed Dec. 18, 1981, now abandoned.

BACKGROUND OF THE INVENTION

Power transmission chains composed of pivotably connected sets of interleaved links are known in the art. In one type of chain, commonly known as a "Silent" chain, each of the links which drivingly engage the teeth of a sprocket is defined by a pair of toes, each toe being at the juncture of an inside flank and an outside flank. The inside flanks are joined by a crotch. The backs of these links are generally arcuate or curved.

It has been suggested to construct a chain with some set of links all having inside flanks which drivingly engage the sprocket teeth, and other set of links all having outside flanks which drivingly engage the sprocket teeth. The uniform sets of links (that is, all inside flank engagement or all outside flanks engagement) may be mixed in a regular or random pattern. When all the links in each rank or set of links are uniform, there is a reduction in the apparent noise level or psychological distraction produced by operation of such a chain. Such a chain is described and claimed in assembly of the proper links in each uniform set of links in the chain, and at the proper positions in the chain.

BRIEF DESCRIPTION OF THE DRAWINGS

FIG. 2 is a side view of a portion of a typical chain according to this invention, also with parts broken away;

FIG. 3 is a plan view of the portion of the chain of FIG. 2;

FIG. 7 is a plan view similar to FIG. 3 but showing a chain with some links out of place.

DESCRIPTION OF THE PREFERRED EMBODIMENTS apertures 74, 74 are provided to receive the pivot means.

While the configuration of the backs of the links are associated with a particular type of link, it is to be understood that the inside flank engaging link could be provided with a flat back, and the outside flank engaging link could be provided with the arcuate back without departing from the spirit of the invention. Moreover, other physical characteristics can be modified to identify the inside or outside flank engagement of each link. For example, all inside flank engagement links can be sprayed with a paint having a color different than that sprayed on other types of links. The finished links can then be illuminated by a light, the reflected light detected and, after examination for the apropriate color spectrum, the link type verified. Alternatively, links of a given type can be magnetized or irridated with a low level of radioactive energy, and the resultant links identified by the presence or absence of the magnetization or the radioactive emission. It has been found most practical and economical to utilize a simple physical modification, such as the shape of the link back surface, in the implementation of this invention.

A chain with some links wrongly located is illustrated in FIG. 7. The links 20, those with outside flank engagement and the flat backs, are stippled to distinguish them from links 22, the inside flank engagement links with curved backs. The two out-of-place links are readily apparent in FIG. 7. A chain with such out-of-place links will be rejected and then brought into specification by substituting the proper links or sets of links in the assembly.

In the manufacture of chains, the links are stamped from sheet steel, treated to improve their physical properties, and ultimately assembled into the final product. The links are transported from the forming to the assembly positons in bins which may hold several thousand links. It thus becomes easy to intermix the link types, especially when the link thickness and pitch (the distance between pivot means centers) are the same. The links are fed into automatic assembling machines, which assemble the sets of links in a relatively long length of chain. Sections of the relatively long length of chain are broken-out into segments of predetermined length, and the ends of each segment are joined by a pivot means to form the chain loops usuable in a sprocket drive.

The automatic assembling machines are adjusted to handle only one type of link and to reject the other, and to assemble the uniform sets of links in the desired fashion, such as in a random mixture of sets or in a particular arrangement of sets. Even when the machines are adjusted to reject the wrong link, at times the wrong link type "sneaks" through. By using the links with a modified physical characteristic as taught herein, the erroneous link can be easily detected, and the correction made.

Figure 8:
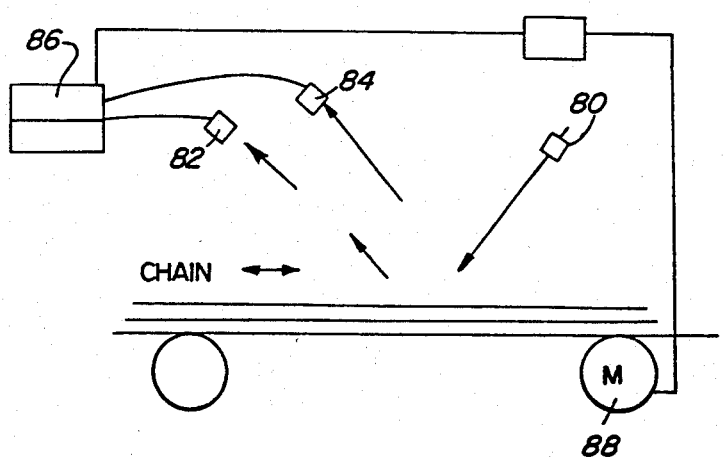
FIG. 8 is a schematic illustration of an optically-based system for detecting the presence and location of "out-of-place" links in a chain.

FIG. 8 illustrates, schematically, an optical device for detecting the presence and location of "out-of-place" links in a set of links. In that chain is produced in relatively long lengths, the chain is conveyed in a generally horizontal path beneath a transverse series of light sources 80 positoned to direct to light toward the back of the chain 10, so some light is reflected from the chain's back surface. The differently configured backs of the links will reflect light differently. Light is reflected from flat surfaces 36 of links 20 in a relatively narrow, cylindrical beam which impinges only on a first array of sensors 82. Light is reflective from curved surfaces 48 of links 22 in a much broader, diverging beam which strikes arrays of both pickups, 82 and 84. The reflected light is picked-up by sensors or pick devices 82, 84, which are connected to an indicator or recording devices 86 which visually, audibly or otherwise indicates the link mixture. An out-of-place link is indicated by an incorrect reflected signal. Device 86 is electrically coupled to a motor 88 of the conveyor drive system. The signal for an out-of-place link can de-energize motor 88 and stop the conveyor, and/or the location of the out-of-place link can be marked for later correction.

A mechanical, electro-mechanical or pneumatic inspection device can be provided in lieu of the optical system described. These can use feelers, either in a pure mechanical system or in an electro-mechanical system, or air jets in a pneumatic system.

Figure 1:
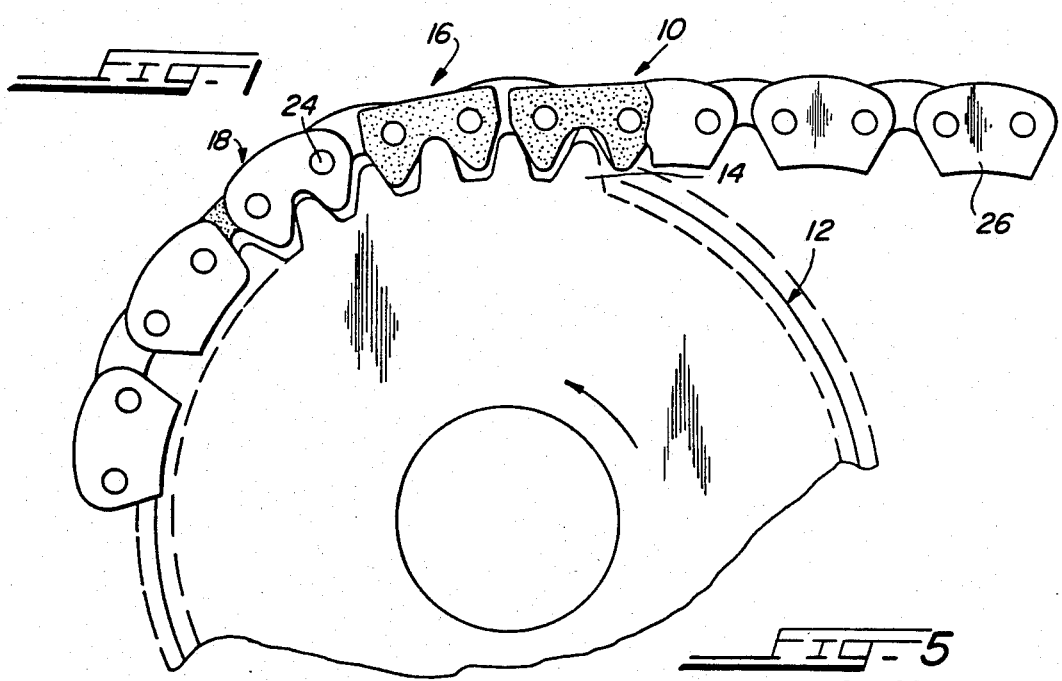
FIG. 1 is a side view of a portion of a chain and a toothed sprocket, with parts broken away incorporating two types of links according to this invention.
Figure 4:
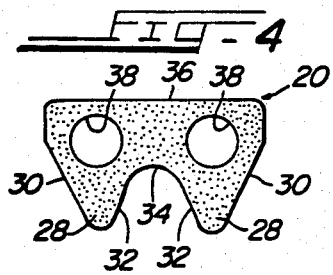
FIG. 4 is a side view of one form of link in the chain of FIGS. 1–3.
Figure 5:
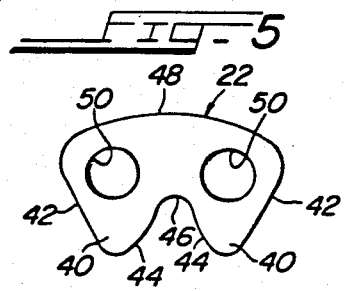
FIG. 5 is a side view of another form of link in the chain of FIGS. 1–3.
Figure 6:
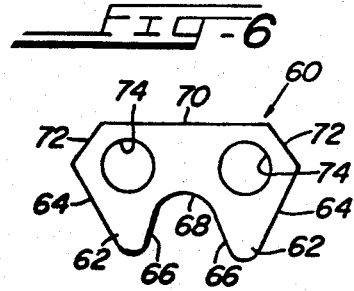
FIG. 6 is a side view of an alternate form of usuable in the chain of FIGS. 1–3.

A "set" of links, as used herein and in the appended claims, means a group of links disposed in one row or rank transversely across the width of the chain, and connected by two adjacent pivot means. For example, a single set of links, with each link aligned one behind the other, would appear similar to the single link 20 in FIG. 4 or the single link 22 in FIG. 5. A first pivot would be inserted into one of the apertures 38 of each of the links 20 in the set, and a second pivot or rod would be inserted into the other aperture 38 of the same set of links.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A method for differentiating between two types of links in a chain adapted for use in a sprocket drive and in which the links drivingly engage the teeth of the sprockets, the chain being composed of pivotable, interconnected and interleaved sets of links, each of said links having a pair of toes defined by converging flanks and a back surface opposite said toes, said chain further being composed of a first type of links and a second type of links both of which drivingly engage the teeth of the sprockets of the sprocket drive with at least one of the flanks thereof, the first type of links having a first flank configuration and the second type of links having a flank configuration which differs from that of said first type of links, comprising:

providing a generally flat and planar back on each link of one type of links;

providing a different configuration back on each link of the other type of links; and inspecting the chain backs to determine the locations of the two types of links.

2. A method of constructing a silent drive chain, the links of which are defined by a pair of toes each formed by diverging flanks some of which flanks drivingly engage the teeth of sprockets in the drive in which the chain is used, the links being further defined by a back surface, comprising:

assembling a series of sets of links and joining them together, each set comprising a plurality of traversely aligned links;

providing some sets of links with a flat and planar back surface and other sets of links with a curved back surface, the flanks of said links in said sets of links having the flat and planar back surface being differently configured than the flanks of said links in said sets of links having the curved back surface; and detecting improperly positioned links by examining their back surfaces.

3. A method of constructing a silent chain especially adapted for use in a sprocket drive arrangement and in which the links drivingly engage the sprocket teeth which comprises assemblying a series of sets of sprocket teeth engaging links, some sets of links being defined by a back surface of one configuration and other sets of links being defined by a back surface of a different configuration, joining a mixture of said sets of links with pivot means, and examining the back surfaces of said links in said chain to detect improperly positioned links in a set of links.

4. The method of differentiating between two types of links in a chain, each of which is adapted for and drivingly engages the teeth of a sprocket in a sprocket drive arrangement, and in which driving links of a first type are arrayed in certain uniform sets and driving links of a second type are arrayed in additional uniform sets, comprising:

producing a plurality of said two types of links, each link having a pair of toes defined by converging flanks, and each type of link having a particular physical characteristic differing from the other type of links;

said first type of links having a first flank configuration and a first additional physical characteristic;

said second type links having a second flank configuration which differs from said first flank configuration and a second additional physical characteristic which differs from said first additional physical characteristic;

sorting said links into uniform sets such that all links in a set are of one of said types of links;

assembling said uniform sets of links into a relatively long length of chain with some sets of links being of said first type of links and some sets of links being of said second type of links and joining the sets together;

passing the assembled length of chain along a predetermined path of travel;

providing inspection apparatus adjacent said predetermined path to examine the physical characteristics of successive sets of links and examining the physical characteristics of successive sets of links to provide an indication when a link of one type of physical characteristic is erroneously positioned in a set of links of the other type of physical characteristic.

5. The method of differentiating between two types of driving links in a chain as set out in claim 4, in which the additional physical characteristic of the links is the shape of each back surface, one type of link having a straight back surface and the other type of link having curved back surface.

6. The method of differentiating between two types of driving links in a chain as set out in claim 4, in which the additional physical characteristics of the links is the shape of each back surface, one type of link having a back surface of one configuration and the other type of link having a back surface of a different configuration.

* * * * *